United States Patent
Tomamoto et al.

(10) Patent No.: US 8,497,006 B2
(45) Date of Patent: Jul. 30, 2013

(54) GLASS ROLL

(75) Inventors: Masahiro Tomamoto, Otsu (JP); Michiharu Eta, Otsu (JP); Hidetaka Oda, Otsu (JP); Tatsuya Takaya, Otsu (JP); Yasuo Yamazaki, Otsu (JP); Hiroshi Takimoto, Otsu (JP); Shinichi Ishibashi, Otsu (JP); Keiji Takagi, Otsu (JP); Daisuke Nagata, Otsu (JP); Takahide Nakamura, Otsu (JP); Toru Sakurabayashi, Otsu (JP); Katsutoshi Fujiwara, Otsu (JP); Mitsuharu Noda, Otsu (JP); Yasuhiko Ogiso, Otsu (JP); Takahide Fujii, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 270 days.

(21) Appl. No.: 13/121,306

(22) PCT Filed: Sep. 30, 2009

(86) PCT No.: PCT/JP2009/067001
§ 371 (c)(1),
(2), (4) Date: Mar. 28, 2011

(87) PCT Pub. No.: WO2010/038760
PCT Pub. Date: Apr. 8, 2010

(65) Prior Publication Data
US 2011/0177347 A1    Jul. 21, 2011

(30) Foreign Application Priority Data

Oct. 1, 2008 (JP) ................................. 2008-256509
Oct. 28, 2008 (JP) ................................. 2008-277121
Sep. 16, 2009 (JP) ................................. 2009-214858

(51) Int. Cl.
*B32B 17/06* (2006.01)

(52) U.S. Cl.
USPC ........ 428/98; 428/906; 242/160.3; 242/160.4

(58) Field of Classification Search
CPC ....................................................... B32B 17/06
USPC .................... 428/98, 906; 242/160.3, 160.4, 242/614
See application file for complete search history.

(56) References Cited

U.S. PATENT DOCUMENTS

| | | | |
|---|---|---|---|
| 3,685,644 | A | 8/1972 | Cothran et al. |
| 4,485,125 | A | 11/1984 | Izu et al. |

(Continued)

FOREIGN PATENT DOCUMENTS

| | | |
|---|---|---|
| EP | 0 716 339 | 6/1996 |
| EP | 0 782 176 | 7/1997 |

(Continued)

OTHER PUBLICATIONS

International Preliminary Report on Patentability and Written Opinion of the International Searching Authority issued May 19, 2011 in International (PCT) Application No. PCT/JP2009/067001.

(Continued)

*Primary Examiner* — Alexander Thomas
(74) *Attorney, Agent, or Firm* — Wenderoth, Lind & Ponack, L.L.P.

(57) ABSTRACT

Provided is a glass roll utilizing a flanged roll core, and reliably inhibiting a glass film from breaking from an end portion in a width direction thereof as an origin of breakage. A glass roll (1) is formed by winding a glass film (4) and a cushion sheet (5), under a state of being superposed, around a roll core (3) including a flange (2) at each end portion thereof, in which an end portion in a width direction of the glass film (4) is separated from the flange (2) on each side in the width direction of the glass film (4), and the cushion sheet (5) is extended beyond the end portion in the width direction of the glass film (4) to the flange (2) side, to thereby form an extension portion (5a).

8 Claims, 8 Drawing Sheets

U.S. PATENT DOCUMENTS

| | | |
|---|---|---|
| 6,350,489 B1 | 2/2002 | Moriyama et al. |
| 6,502,423 B1 | 1/2003 | Ostendarp et al. |
| 6,815,070 B1 | 11/2004 | Bürkle et al. |
| 2007/0131574 A1 | 6/2007 | Aoki |
| 2007/0275338 A1 | 11/2007 | Acker et al. |
| 2009/0314032 A1 | 12/2009 | Tomamoto et al. |
| 2010/0276066 A1 | 11/2010 | Kondo |
| 2011/0177325 A1 | 7/2011 | Tomamoto et al. |
| 2011/0200812 A1 | 8/2011 | Tomamoto et al. |

FOREIGN PATENT DOCUMENTS

| | | |
|---|---|---|
| EP | 0 808 722 | 11/1997 |
| EP | 2 236 281 | 10/2010 |
| EP | 2 332 856 | 6/2011 |
| EP | 2 336 050 | 6/2011 |
| GB | 503557 | 4/1939 |
| JP | 1-500990 | 4/1989 |
| JP | 2-1503 | 1/1990 |
| JP | 2-48577 | 4/1990 |
| JP | 11-043180 | 2/1999 |
| JP | 2001-097733 | 4/2001 |
| JP | 2001-318219 | 11/2001 |
| JP | 2002-534305 | 10/2002 |
| JP | 2006-264786 | 10/2006 |
| JP | 2006-347783 | 12/2006 |
| JP | 2007-119322 | 5/2007 |
| JP | 2008-133174 | 6/2008 |
| JP | 2009-173307 | 8/2009 |
| WO | 87/06626 | 11/1987 |
| WO | WO 87/06626 | * 11/1987 |
| WO | 2006/009225 | 1/2006 |
| WO | 2008/123124 | 10/2008 |

OTHER PUBLICATIONS

Supplementary European Search Report issued Oct. 26, 2012 in corresponding European Application No. 09817791.8.

International Search Report issued Nov. 24, 2009 in International (PCT) Application No. PCT/JP2009/067001.

Supplementary European Search Report issued Jul. 27, 2012 in corresponding European Patent Application No. 09817792.6.

Supplementary European Search Report issued Mar. 13, 2013 in corresponding European Patent Application No. 09817790.0.

Supplementary European Search Report issued Mar. 4, 2013 in corresponding European Patent Application No. 09817789.2.

Supplementary European Search Report issued Mar. 26, 2013 in corresponding European Patent Application No. 09817793.4.

* cited by examiner

GLASS ROLL

TECHNICAL FIELD

The present invention relates to an improved technology for a package form for a glass film which is used as a glass substrate for a flat panel display and a solar cell, and used as cover glass or the like for an organic light-emitting diode (OLED) lighting.

BACKGROUND ART

As is well known in the art, in recent years, there is a demand for further thinning of various glass plates including glass substrates for a flat panel display, such as a liquid crystal display, a plasma display, an organic light-emitting diode (OLED) display, or a field emission display. Along with the demand for the further thinning, as disclosed, for example, in Patent Literature 1, a film-like sheet glass having a thickness of 200 μm or less has been developed.

Further, as disclosed, for example, in Patent Literature 2, as a package form for the above-mentioned sheet glass thinned into a film (hereinafter, referred to as glass film), there is adopted a glass roll formed by winding the glass film into a roll around a roll core while the glass film is superposed on an intermediate layer. The package form utilizes a characteristic that the glass film has sufficient flexibility due to its thinness.

On the other hand, the glass film has a shortcoming that the glass film is likely to break due to its thinness. Therefore, as disclosed in Patent Literature 2, even in a case of adopting the glass roll as a package form for a glass film, there is a problem that remains to be solved.

The problem is as follows. That is, when the glass roll is placed on a placed surface such as a pallet while the roll core is arranged in a laid posture, i.e., a substantially horizontal posture, the glass film is held in contact with the placed surface through the intermediate layer, and hence concentration of stress occurs on the contact portion of the glass film. Consequently, the glass film easily breaks.

In this context, in order to cope with the above-mentioned problem, a package form for a pressure measuring sheet disclosed in Patent Literature 3 may be applicable, though Patent Literature 3 does not relate to the glass film. That is, Patent Literature 3 discloses a package form, in which a flange larger in size than an outer diameter of the wound pressure measuring sheet is provided at each end of a roll core around which the pressure measuring sheet is wound, and the pressure measuring sheet is separated from the placed surface.

CITATION LIST

Patent Literature

Patent Literature 1: JP 2008-133174 A
Patent Literature 2: JP 2002-534305 A
Patent Literature 3: JP 2009-173307 A

SUMMARY OF INVENTION

Technical Problem

By the way, as disclosed in Patent Literature 3, if the flange is provided at each end portion of the roll core, in a case where the glass roll is placed on the placed surface such as a pallet, the flange receives the load, and hence it is possible to prevent such a situation that extreme load acts on the contact portion of the glass film.

Meanwhile, unlike the pressure measuring sheet, the glass film is a material that is likely to break. That is, in a case of the pressure measuring sheet, it is only necessary to consider preventing breakage of a micro-capsule for pressure measurement formed on a surface of the sheet. However, in a case of the glass film, it is necessary to consider preventing breakage of not only the surface of the film but also an end portion of the film constituting an edge portion. In particular, each end portion in a width direction of the glass film is sometimes exposed to an outside in a state of the glass roll, and hence is likely to serve as an origin of breakage. Thus, it is necessary to take some kind of measures to prevent breakage.

However, the package form disclosed in Patent Literature 3 is not made in consideration of packaging the glass film, and hence a configuration for preventing breakage of the each end portion in the width direction of the glass film is not described. Further, the package form disclosed in Patent Literature 3 is originally targeted for the pressure measuring sheet, and hence there is not the problem described above in Patent Literature 3. In other words, in the case of the pressure measuring sheet, breakage of the micro-capsule is concerned, and hence breakage of each end portion in the width direction of the sheet, which has no micro-capsule, is not substantially concerned.

Note that, in Patent Literature 3, in order to prevent breakage of the micro-capsule, there is disclosed a configuration of providing a gap between the flange and the end portion in the width direction of the pressure measuring sheet. However, like this configuration, if the gap is simply provided between the flange and the end portion in the width direction of the glass film, it is impossible to satisfactorily prevent breakage of the end portion in the width direction of the glass film. That is, due to vibration and impact during transportation, the glass film is misaligned in an axial direction of the roll core in some cases. In this case, the end portion in the width direction of the glass film may come into direct contact with the flange, to thereby break.

In view of the above-mentioned circumstances, it is a technical object of the present invention to provide a glass roll utilizing a flanged roll core, and reliably inhibiting a glass film from breaking from an end portion in a width direction thereof as an origin of breakage.

Solution to Problem

The present invention, which has been made to solve the above-mentioned problem, provides a glass roll, which is formed by winding a glass film and a cushion sheet, under a state of being superposed, around a roll core including a flange at each end portion of the roll core, in which an end portion in a width direction of the glass film is separated from the flange on each side in the width direction of the glass film, and cushioning means is arranged between the flange and the end portion in the width direction of the glass film.

With this configuration, the end portion in the width direction of the glass film is separated from the flange, and hence it is possible to reduce a risk in that the end portion in the width direction of the glass film comes into contact with the flange. In addition, even if the glass film wound into a roll is misaligned due to vibration, impact, and the like during transportation, the cushioning means is arranged between the end portion in the width direction of the glass film and the flange, and hence there is no such situation that the end portion in the width direction of the glass film comes into direct contact with the flange. Therefore, it is possible to reliably inhibit the glass film from breaking from the end portion in the width direction thereof as an origin of breakage.

In the above-mentioned configuration, the cushion sheet may be extended beyond the end portion in the width direction of the glass film, and the cushioning means may include an extension portion of the cushion sheet.

With this configuration, the cushion sheet is capable of protecting not only front and back surfaces of the glass film but also each end portion in the width direction of the glass film, which is convenient.

In the above-mentioned configuration, the extension portion of the cushion sheet may be out of contact with the flange.

With this configuration, when winding or taking out the glass film, such a trouble is less likely to arise that the extension portion of the cushion sheet is caught on the flange. Thus, even in a state in which the flange is attached, it is possible to smoothly proceed a winding operation and a taking-out operation of the glass film.

In the above-mentioned configuration, the extension portion of the cushion sheet may be held in contact with the flange.

With this configuration, the extension portion of the cushion sheet reliably fills a gap between the flange and the end portion in the width direction of the glass film, and hence, even if vibration and impact are applied to the glass roll during transportation, the glass film is less likely to be misaligned.

Note that, in this case, it is preferred that an extension width of the cushion sheet be larger than a width of the gap between the flange and the end portion in the width direction of the glass film. With this, the cushion sheet is fills in the gap between the flange and the end portion in the width direction of the glass film while being bent, and hence it is possible to obtain a higher cushioning effect.

In the above-mentioned configuration, the cushioning means may include an another cushion member provided separately from the cushion sheet.

With this configuration, in addition to making the cushion member of the same kind of material as that of the cushion sheet, the cushion member can be made of a material different from the material for the cushion sheet, and hence there is increased a degree of freedom in selection of usable materials for the cushion member. In other words, a material that is less likely to be elastically deformed can be selected for the cushion sheet, and a material that is likely to be elastically deformed can be selected for the cushion member. Further, after the glass film and the cushion sheet are wound around the roll core, it is also possible to arrange the cushion member in the gap between the flange and the end portion in the width direction of the glass film. Consequently, it is possible to smoothly perform the winding operation and the taking-out operation of the glass film.

In this case, the cushion member may be held in contact with both the flange and the end portion in the width direction of the glass film.

With this configuration, the cushion member reliably fills the gap between the flange and the end portion in the width direction of the glass film, and hence, even if vibration and impact are applied to the glass roll during transportation, the glass film is less likely to be misaligned.

Further, the cushion member may be held in contact with only any one of the flange and the end portion in the width direction of the glass film.

With this configuration, a space still remains between the flange and the end portion in the width direction of the glass film. Thus, when performing an attaching operation of the cushion member, the winding operation of the glass film, and the like, it is possible to ensure satisfactory workability.

In the above-mentioned configuration, it is preferred that the each end portion in the width direction of the glass film include a cut surface which is cut by laser splitting.

With this configuration, a defect, which may cause breakage such as small flaws (for example, micro cracks), is less likely to occur on the each end portion in the width direction of the glass film. In other words, the cut surface has a smooth cross-section with high strength owing to the laser splitting, and hence, in synergy with the above-mentioned cushioning means (such as cushion sheet), it is possible to more reliably prevent the glass film from breaking from the end portion in the width direction thereof as an origin of breakage. Further, in a case of the laser splitting, the glass film is cut utilizing thermal stress generated by heat of laser irradiation and through cooling by a refrigerant, and hence it is unnecessary to heat the glass film up to high temperature unlike in a case of fusing. Therefore, when utilizing the laser splitting, there is no such defect that the cut surface is fused to be thickened or extreme warpage occurs in the glass film due to heat at the time of cutting.

Advantageous Effects of Invention

According to the present invention described above, in the glass roll utilizing the flanged roll core, the flange and the end portion in the width direction of the glass film are separated from each other, and the cushioning means is arranged between the flange and the end portion in the width direction of the glass film. Thus, it is possible to satisfactorily protect the end portion in the width direction of the glass film. Therefore, it is possible to reliably inhibit the glass film from breaking from the end portion in the width direction thereof as an origin of breakage.

DESCRIPTION OF EMBODIMENTS

In the following, embodiments of the present invention are described with reference to the attached drawings.

Figure 1:
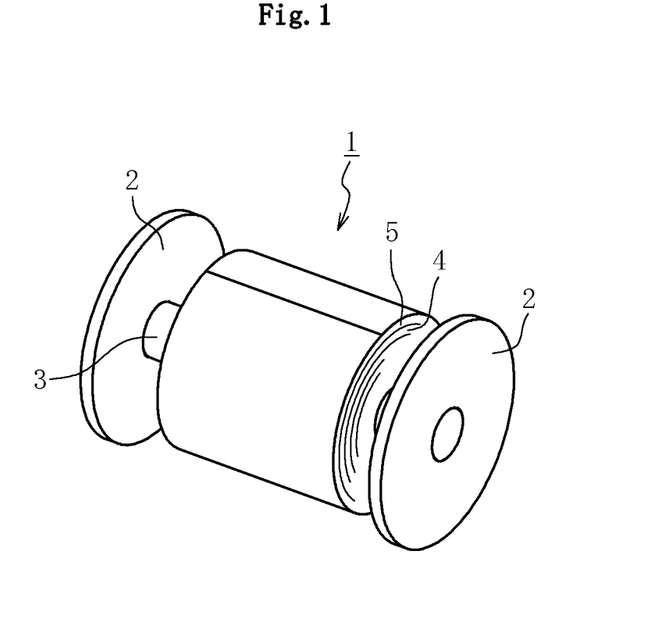
FIG. 1 A perspective view of a glass roll according to a first embodiment of the present invention.

FIG. 1 is a perspective view illustrating an entire configuration of a glass roll according to a first embodiment of the present invention. A glass roll 1 is formed by winding a glass film 4 and a cushion sheet 5, under a state of being superposed, around a roll core 3 including a flange 2 at each end portion thereof.

The glass film 4 is glass formed by an overflow downdraw method to have a thickness of from 1 μm to 200 μm (preferably from 10 μm to 100 μm). With the thickness within the above-mentioned numerical range, it is possible to impart, to the glass film 4, appropriate flexibility involving no trouble at the time of winding. Note that, when the thickness of the glass film 4 is less than 1 μm, handling of the glass film is troublesome because of lack of strength. When the thickness of the glass film 4 exceeds 200 μm, satisfactory flexibility is not obtained, which leads to a problem in that a winding radius is inevitably increased.

As a glass composition of the glass film 4, there can be used various glass compositions of silicate glass and the like, such as silica glass and borosilicate glass. However, it is preferred to use non-alkali glass. The reason is as follows. When the glass film 4 contains an alkali component, a phenomenon, so-called white weathering, occurs so that the glass film is structurally rough. Further, when the glass film 4 is curved, there is a risk in that the glass film is prone to break from a portion that is weathered over time. Note that, herein, the non-alkali glass includes glass that does not substantially contain an alkali component, specifically, glass containing an alkali metal oxide of 1000 ppm or less (preferably, of 500 ppm or less, and more preferably, of 300 ppm or less).

In order to prevent the glass film 4 from being flawed, the cushion sheet 5 is wound while being superposed on the glass film 4, and is interposed between plies of the glass film 4, which are opposed to each other in a radial direction. Specifically, the cushion sheet 5 is arranged so as to cover entire front and back surfaces of the glass film 4, and protects the entire front and back surfaces of the glass film 4. Thus, it is possible to reliably prevent such a situation that a glass ply of the glass film 4 formed by winding the glass film 4 is held in direct contact with another glass ply, to thereby be flawed. Further, even if any one of the glass plies of the glass film 4 breaks, the glass film 4 is interposed between plies of the cushion sheet 5, and hence it is possible to reduce a risk in that glass powder generated due to breakage is scattered to another place.

In view of obtaining a satisfactory cushioning effect, it is preferred that the thickness of the cushion sheet 5 be 10 μm or more. In view of preventing an extreme increase in roll outer diameter of the glass roll 1, it is preferred that the thickness of the cushion sheet 5 be 2000 μm or less.

As the cushion sheet 5, other than an inserting paper and a nonwoven fabric, there can be also used, for example, an ionomer film, a polyethylene film, a polypropylene film, a polyvinyl chloride film, a polyvinylidene chloride film, a polyvinyl alcohol film, a polypropylene film, a polyester film, a polycarbonate film, a polystyrene film, a polyacrylonitrile film, an ethylene vinyl acetate copolymer film, an ethylene-vinyl alcohol copolymer film, an ethylene-methacrylate copolymer film, a nylon film (polyamide film), a polyimide film, or a resin sheet such as cellophane. Note that, in view of ensuring both cushioning performance and strength, it is preferred that, as the cushion sheet 5, a foamed resin sheet such as a polyethylene foam sheet be used. Further, by dispersing silica or the like in those resin sheets, a degree of slip on the glass film 4 may be increased. In this case, owing to the degree of slip, it is possible to absorb misalignment occurring between the glass film 4 and the cushion sheet 5.

It is preferred that conductivity be imparted to the cushion sheet 5. With this, when the glass film 4 is taken out of the glass roll 1, the glass film 4 and the cushion sheet 5 are less likely to be held in close contact with each other due to static electricity, and hence there is an advantage that the glass film 4 and the cushion sheet 5 are easily peeled off. As a method of imparting conductivity to the cushion sheet 5, for example, in a case where the cushion sheet 5 is made of a resin, there can be given a method of adding a component for imparting the conductivity, such as polyethylene glycol, into the cushion sheet 5. Further, in a case where the cushion sheet 5 is made of an inserting paper, there can be also given a method of adding conductive fiber into the inserting paper. Further, it is possible to impart the conductivity to the cushion sheet 5 also by laminating a conductive layer, such as an indium-tin-oxide (ITO) film, on a surface of the cushion sheet 5.

Note that, in a case of, after forming the glass film 4 from molten glass, winding continuously the glass film 4 thus formed, to thereby manufacture the glass roll 1 (see FIG. 7 described below), it is preferred that the cushion sheet 5 have heat resistance high enough to withstand transformation, for example, softening at a temperature of about 100° C.

Although the roll core 3 has a hollow cylindrical shape in this embodiment, the roll core may have a solid columnar shape.

The material for the roll core 3 is not particularly limited and, for example, there can be used metals such as an aluminum alloy, a stainless steel, a manganese steel, and a carbon steel, thermosetting resins such as a phenolic resin, a urea resin, a melamine resin, an unsaturated polyester resin, an epoxy resin, polyurethane, and a diallyl terephthalate resin, thermoplastic resins such as polyethylene, polypropylene, polystyrene, an AS resin, an ABS resin, a methacrylate resin, and vinyl chloride, reinforced plastics obtained by mixing those thermosetting resins or thermoplastic resins with reinforcement fibers such as a glass fiber or a carbon fiber, and paper. Of the above-mentioned materials, the aluminum alloy and the reinforced plastics are preferred in view of ensuring strength, and the paper is preferred in view of a reduction in weight. Note that, in view of preventing occurrence of flaws on a surface of the glass film 4, it is preferred that the cushion sheet 5 be wound one or more turns around the roll core 3 in advance.

An outer diameter of the flange 2 is larger than an outer diameter of the glass film 4 wound around the roll core 3. When the glass roll 1 is placed in a laid posture on a placed surface such as a pallet, load of the glass roll is supported by the flanges 2, and the glass film 4 is positioned away from the placed surface.

Figure 2:
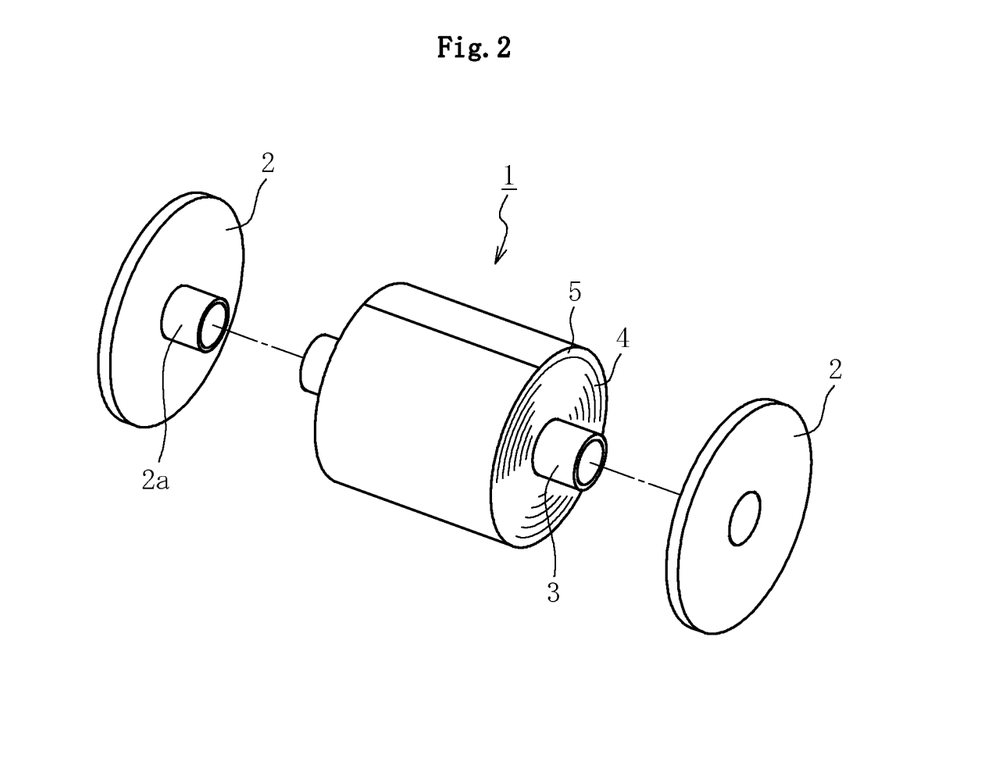
FIG. 2 A perspective view of components of the glass roll according to the first embodiment in an exploded arrangement.

As illustrated in FIG. 2, each of the flanges 2 includes a shaft portion 2a removably inserted to each end portion of the roll core 3, and is removably attached to the roll core 3. Therefore, when winding or taking out the glass film 4, the flanges 2 can be removed so as not to hinder the operation. Note that, in a case where the flanges 2 do not hinder the operation, the flanges 2 may be integrated with the roll core 3.

Note that, though the flanges 2 have circular shapes in FIG. 1 and FIG. 2, the flanges 2 may have polygonal shapes. If the flanges 2 have polygonal shapes, it is possible to prevent the glass roll 1 from rolling, which is advantageous in facilitating handling. Further, as a material for the flanges 2, the same kind of material for the roll core 3 can be used. However, the flanges 2 need to support the load of the glass roll, and hence it is preferred that the flanges be made of a highly rigid material such as metal.

Figure 3:
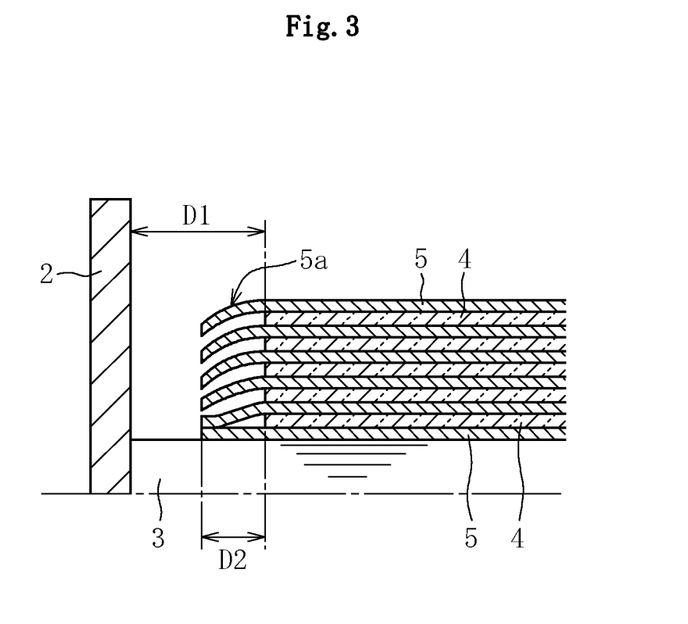
FIG. 3 An enlarged sectional view of a main part between a glass film and a flange in the glass roll according to the first embodiment.

As a specific configuration of the glass roll 1, the following points are given. Specifically, as illustrated in FIG. 3, firstly, an end portion in the width direction of the glass film 4 is separated from the flange 2, and secondly, cushioning means is arranged in a gap between the end portion in the width direction of the glass film 4 and the flange 2.

First, the first feature is realized in such a manner that an axial dimension of the roll core 3 is made longer than a widthwise dimension of the glass film 4. In this manner, each end portion in the width direction of the glass film 4 is separated from the flange 2 opposed to the each end portion. Thus, it is possible to suppress such a situation that the end portion in the width direction of the glass film 4 is abraded due to contact with the flange 2, or impact and vibration acting on the flange 2 are directly applied to the end portion in the width direction of the glass film 4.

The second feature is to ensure an effect of preventing breakage of the end portion in the width direction of the glass film 4 in synergy with the first feature. That is, in a case where the end portion in the width direction of the glass film 4 and the flange 2 are simply separated from each other, when the glass film 4 is misaligned due to vibration and impact during transportation, the end portion in the width direction of the glass film 4 may come into direct contact with the flange 2, to thereby break. In this context, as the second feature, the cushioning means is arranged in a gap between the end portion in the width direction of the glass film 4 and the flange 2. If the glass film 4 is misaligned, the end portion in the width direction of the glass film 4 is prevented from coming into direct contact with the flange 2. Note that, misalignment of the glass film 4 described herein means misalignment of the glass film 4 along an axial direction of the roll core 3, and includes, for example, a case where the entire glass film 4 is moved along the axial direction of the roll core 3 and a case where an outer diameter side of the glass film 4 is largely moved relative to an inner diameter side thereof so that plies of the end portion in the width direction of the glass film 4 are laminated in a stepped manner.

Specifically, in this embodiment, the cushioning means is constituted by an extension portion 5a of the cushion sheet 5 extended beyond the each end portion in the width direction of the glass film 4 to the flange 2 side. The extension portion 5a of the cushion sheet 5 is formed by winding the cushion sheet 5 while being superposed on the glass film 4, the cushion sheet 5 having the widthwise dimension larger than that of the glass film 4. When the extension portion 5a of the cushion sheet 5 is formed in this way, the end portion in the width direction of the glass film 4 is covered with the extension portion 5a of the cushion sheet 5. Therefore, even if the glass film 4 is misaligned due to vibration and impact during transportation, it is possible to prevent such a situation that the end portion in the width direction of the glass film 4 comes into direct contact with the flange 2. In addition, if the end portion in the width direction of the glass film 4 comes into contact with the flange 2 through the extension portion 5a, the impact and vibration occurring at this time are absorbed by the extension portion 5a having a cushioning property. Therefore, the extension portion 5a of the cushion sheet 5 can reduce breakage of the end portion in the width direction of the glass film 4 as much as possible.

Moreover, in this embodiment, the extension portion 5a of the cushion sheet 5 is out of contact with the flange 2. That is, an extension width D2 of the extension portion 5a of the cushion sheet 5 is smaller than a separation distance D1 between the flange 2 and the end portion in the width direction of the glass film 4. In other words, the axial dimension of the roll core 3 (separation distance between inner walls of the flanges 2) is larger than the widthwise dimension of the cushion sheet 5. With this configuration, the extension portion 5a of the cushion sheet 5 is out of contact with the flange 2, and hence the extension portion 5a of the cushion sheet 5 is less likely to be caught on the flange 2 even in a state in which the flange 2 is attached. Thus, even under the state in which the flange 2 is attached, it is possible to smoothly perform a winding operation and a taking-out operation of the glass film 4, which is convenient.

Figure 4:
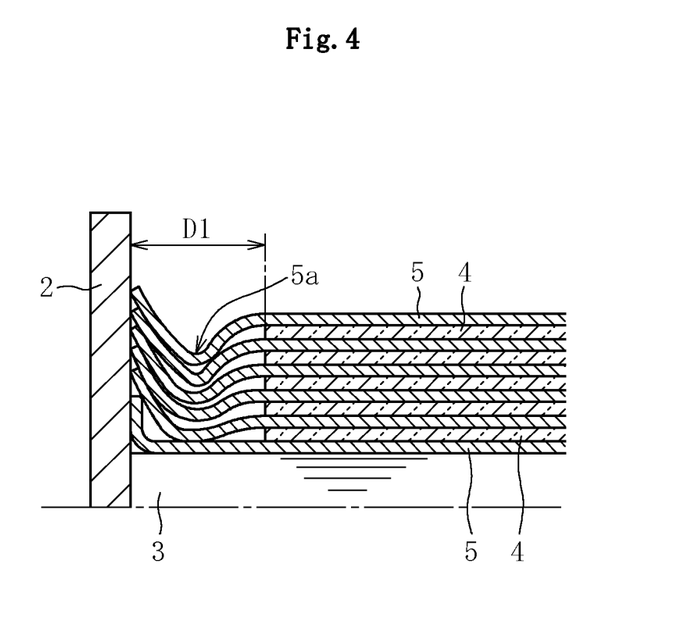
FIG. 4 An enlarged sectional view of a main part between the glass film and the flange in the glass roll according to a second embodiment of the present invention.

FIG. 4 is an enlarged sectional view of a main part between the glass film and the flange in the glass roll according to a second embodiment of the present invention. The glass roll 1 according to the second embodiment is different from the glass roll 1 according to the first embodiment in that the extension portion 5a of the cushion sheet 5 is held in contact with the flange 2. With this configuration, the extension portion 5a of the cushion sheet 5 reliably fills a gap between the flange 2 and the end portion in the width direction of the glass film 4, and hence, even if vibration and impact are applied to the glass roll 1 during transportation, the glass film 4 is less likely to be misaligned. In this case, as illustrated in the drawing, it is preferred that the extension width of the cushion sheet 5 be larger than the separation distance D1 between the flange 2 and the end portion in the width direction of the glass film 4. With this configuration, plies of the cushion sheet 5 are laminated on one another while being bent, and hence are fills in the gap between the flange 2 and the end portion in the width direction of the glass film 4. Consequently, it is possible to obtain a higher cushioning effect.

Figure 5:
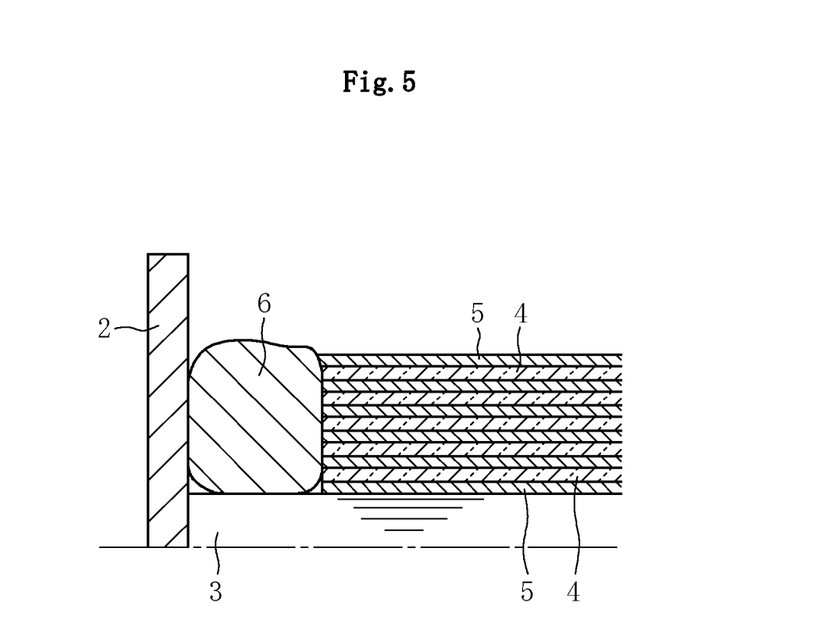
FIG. 5 An enlarged sectional view of a main part between the glass film and the flange in the glass roll according to a third embodiment of the present invention.

FIG. 5 is an enlarged sectional view of a main part between the glass film and the flange in the glass roll according to a third embodiment of the present invention. The glass roll 1 according to the third embodiment is different from the glass roll 1 according to the first and second embodiments in that the cushioning means is constituted by an another cushion member 6 provided separately from the cushion sheet 5. That is, in this embodiment, there is adopted a configuration in which, by pushing the cushion member 6 into the gap between the flange 2 and the end portion in the width direction of the glass film 4, the cushion member 6 is held in the gap. Note that, in this case, the end portion in the width direction of the glass roll 1 is protected with the cushion member 6, and hence, as illustrated in the drawing, the cushion sheet 5 may not be extended beyond the glass film 4.

As the cushion member 6, the same kind of material as that of the cushion sheet 5 exemplified above can be used. In addition, for example, an air bag or a foamed resin block can be used. Further, a sheet-like member, such as a film or a fabric, may be, for example, folded to be put into the gap between the flange 2 and the end portion in the width direction of the glass film 4.

Note that, under a state in which the cushion sheet 5 is extended beyond the glass film 4, the cushion member 6 may be pushed into the gap between the flange 2 and the end portion in the width direction of the glass film 4. In this way, when pushing in the cushion member 6, it is possible to protect the end portion in the width direction of the glass film 4 with the cushion sheet 5. Thus, when pushing in the cushion member 6, it is possible to prevent such a trouble that the cushion member 6 is caught on the end portion in the width direction of the glass film 4.

Figure 6:
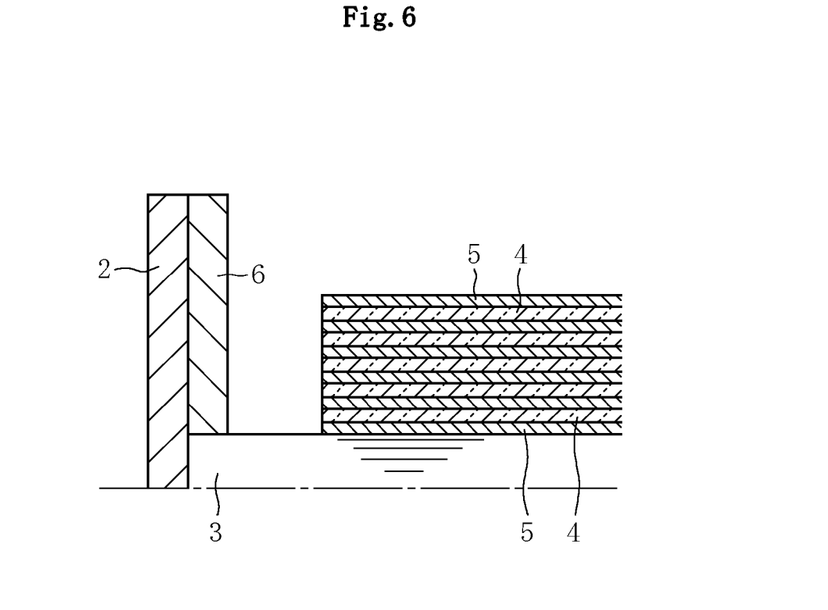
FIG. 6 An enlarged sectional view of a main part between the glass film and the flange in the glass roll according to a fourth embodiment of the present invention.

FIG. 6 is an enlarged sectional view of a main part between the glass film and the flange in the glass roll according to a fourth embodiment of the present invention. The glass roll 1 according to the fourth embodiment is different from the glass roll 1 according to the third embodiment in that the cushion member 6 provided separately from the cushion sheet 5 is held in contact with only the flange 2. That is, the cushion member 6 is fixed on the inner wall of the flange 2. Note that, in the illustrated example, the cushion sheet 5 is not extended beyond the glass film 4. However, in view of more reliably preventing breakage of the end portion in the width direction of the glass film 4, it is preferred that, even in this case, the cushion sheet 5 be extended to form the extension portion. Further, the cushion member 6 may be held in contact with only the end portion side in the width direction of the glass film 4.

Next, a manufacturing device for the glass roll 1 and a method of manufacturing the glass roll using the device according to the above-mentioned embodiments are briefly described.

Figure 7:
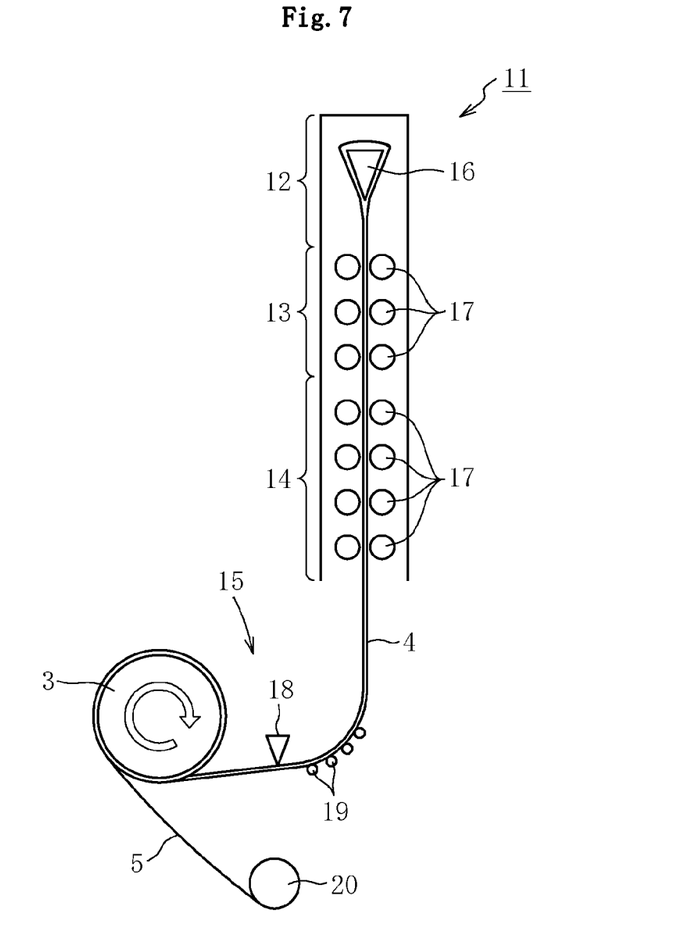
FIG. 7 A longitudinal sectional view illustrating an example of a manufacturing device for a glass roll according to the present invention.

As illustrated in FIG. 7, a manufacturing device 11 for a glass roll forms the glass film 4 by the overflow downdraw method, and includes a forming zone 12, an annealing zone (annealer) 13, a cooling zone 14, and a processing zone 15 in the stated order from an upstream side.

In the forming zone 12, a forming trough 16 with a wedge-shaped cross-section is arranged. Molten glass supplied to the forming trough 16 is overflowed from a top of the forming trough 16, and fused at a lower end portion thereof. In this way, the glass film 4 is formed from the molten glass.

In the annealing zone 13, while annealing the glass film 4, the residual strain is removed (annealing process). In the cooling zone 14, the annealed glass film 4 is cooled sufficiently. In the annealing zone 13 and the cooling zone 14, a plurality of rollers 17 for guiding the glass film 4 downward are arranged. Note that, the uppermost rollers 17 function as cooling rollers for cooling each end portion in the width direction of the glass film 4.

In the processing zone 15, there is arranged cutting means 18 for cutting (Y-cutting) the each end portion in the width direction of the glass film 4 (disused portion thickened relative to a center portion in the width direction thereof due to contact with the cooling rollers) along a conveying direction. The cutting means 18 may form the scribe line with a diamond cutter, and may cut the each end portion in the width direction along the scribe line by pulling the each end portion (disused portion) in the width direction of the glass film 4 outward in the width direction. However, in view of increasing strength of the cut end surface, it is preferred to cut the each end portion in the width direction of the glass film 4 by the laser splitting. When utilizing the laser cutting as described above, a defect, which may cause breakage such as small flaws (for example, micro cracks), is less likely to occur on the each end portion in the width direction of the glass film 4. Consequently, it is possible to increase failure strength of the each end portion in the width direction of the glass film 4. Specifically, when utilizing the laser splitting, without being subjected to polishing or the like after the cutting, each end surface in the width direction of the glass film 4 is allowed to have an arithmetic average roughness Ra (compliant to JIS B0601:2001) of 0.1 μm or less (preferably, 0.05 μm or less).

Figure 8:
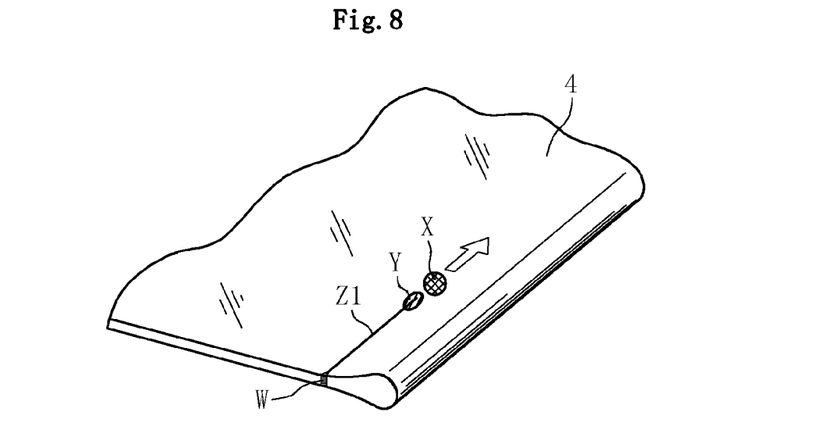
FIG. 8 An explanatory diagram illustrating a step of cutting (Y-cutting) each end portion in a width direction of the glass film by the manufacturing device illustrated in FIG. 7.

The laser splitting is a method of cutting the glass film 4 using thermal stress generated by heat of laser irradiation and generated through cooling by a refrigerant. Specifically, cutting is performed in the following procedure. That is, as illustrated in FIG. 8, a crack W is formed in an end portion on a downstream side of the glass film 4, and, after scanning the glass film along a longitudinal direction of the glass film 4 with a heating point X of laser irradiation, the heated portion is cooled while scanning the glass film with a cooling point Y of a refrigerant, to thereby form a split line Z1 while causing the crack W to develop due to the thermal stress generated by heating and cooling. Here, the split line Z1 is formed continuously from a front surface up to a back surface of the glass film 4. Therefore, without performing ex-post bending and breaking, etc., the each end portion in the width direction (disused portion) is cut off at the point in time when the split line Z1 is formed. Note that, under a state in which the heating point X of the laser and the cooling point Y of the refrigerant are fixed, scanning with the heating point X of the laser and the cooling point Y of the refrigerant is performed by sequentially conveying the glass film 4 to a downstream side in a conveying direction (left direction in FIG. 7).

As illustrated in FIG. 7, in this embodiment, cutting of the each end portion in the width direction of the glass film 4 by the cutting means 18 is performed under a state in which the glass film 4 is curved and changed from an upright posture into a laid posture. At this time, the curved portion of the glass film 4 is supported by support rollers 19 from below. Then, the glass film 4, from which the each end portion in the width direction (disused portion) is eliminated, is wound around the roll core 3 arranged at a position shifted laterally from a position directly below a cooling zone 14.

At this time, the cushion sheet 5 is pulled out of a cushion sheet roll 20 arranged below the roll core 3, and, under a state in which the pulled-out cushion sheet 5 is superposed on an outer circumferential side of the glass film 4, the glass film 4 and the cushion sheet 5 are wound around the roll core 3. In this way, after the glass film 4 is wound so as to have a predetermined roll outer diameter, bending and breaking are performed by forming a scribe line in the width direction of the glass film 4 with use of the cutting means (not shown) (for example, see FIG. 9 described below). In this way, only the glass film 4 is cut (X-cut). After a trailing end of the cut glass film 4 is wound, the cushion sheet 5 is further wound one or more turns continuously, and the cushion sheet 5 is cut. Thus, manufacturing of the glass roll 1 is completed.

In this case, an outermost layer of the glass roll 1 is constituted by the cushion sheet 5. However, in view of protection of the glass film 4, it is preferred that the cushion sheet 5 be wound around the roll core 3 in advance and an innermost layer of the glass roll 1 be also constituted by the cushion sheet 5.

Note that, in a case where the cushion sheet is superposed on the outer circumferential side of the glass film 4, and then the glass film 4 and the cushion sheet 5 are wound, the glass film 4 and the cushion sheet 5 may be simultaneously cut at a stage of having the predetermined roll outer diameter. In other words, winding is performed so that the cushion sheet 5 is always situated on the outer circumferential side of the glass film 4, and hence the outermost layer of the glass roll 1 can be constituted by the cushion sheet 5 without winding only the cushion sheet 5 additionally.

Further, under a state in which the cushion sheet 5 is superposed on an inner circumferential side of the glass film 4, the glass film 4 and the cushion sheet 5 may be wound. In this case, it is preferred that, at the stage of having the predetermined roll outer diameter, after cutting only the glass film 4 in the width direction and winding the trailing end of the cut glass film, the cushion sheet 5 be further wound one or more turns continuously and then the cushion sheet 5 be cut. In this way, the innermost layer and the outermost layer of the glass roll 1 can be constituted by the cushion sheet 5.

Figure 9A:
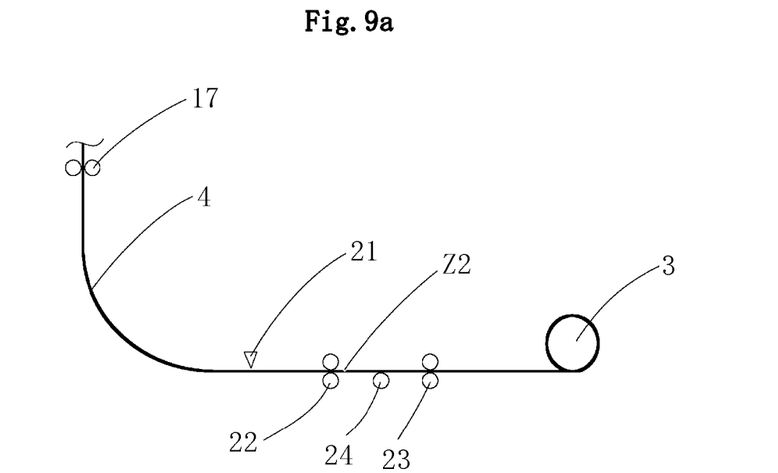
FIG. 9(a) An explanatory diagram illustrating a step of cutting (X-cutting) the glass film in a width direction by the manufacturing device illustrated in FIG. 7, and illustrating a state at an early stage of the cutting step.
Figure 9B:
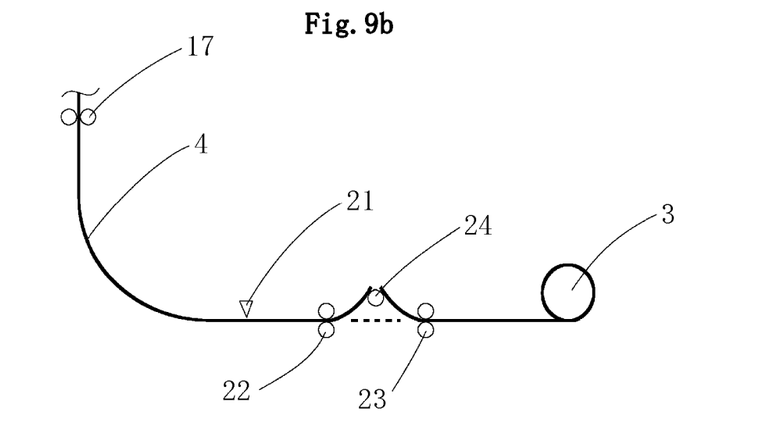
FIG. 9(b) An explanatory diagram illustrating the step of cutting (X-cutting) the glass film in the width direction by the manufacturing device illustrated in FIG. 7, and illustrating a state at a middle stage of the cutting step.
Figure 9C:
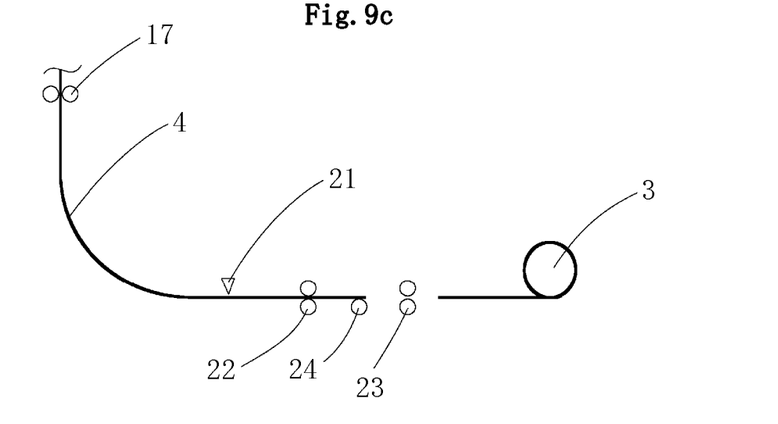
FIG. 9(c) An explanatory diagram illustrating the step of cutting (X-cutting) the glass film in the width direction by the manufacturing device illustrated in FIG. 7, and illustrating a state at a latter stage of the cutting step.

The glass film 4 is rich in flexibility due to its thinness. Thus, it is difficult to bend and break the glass film in the width direction by an ordinary method, and hence it is preferred to bend and break the glass film in the width direction by a method illustrated in FIGS. 9(*a*) to 9(*c*). That is, as illustrated in FIG. 9(*a*), after a scribe line Z2 is formed in the width direction by cutting means 21 (for X-cutting), the glass film 4 is conveyed as it is, and the scribe line Z2 passes pre-cutting rollers 22. Then, as illustrated in FIG. 9(*b*), rotation speed of post-cutting rollers 23 and winding speed of the glass roll 1 are slowed relative to rotation speed of the pre-cutting rollers 22, and a cutting roller 24 is lifted up from a conveyance line by drive means (not shown). As a result, the portion with the scribe line Z2 of the glass film 4 subjected to bending is raised upward and bent, and the bending and breaking are performed through concentration of stress generated at this time. Then, the cutting roller 24 is lowered, and the winding speed of the glass roll 1 is increased after the post-cutting end portion passes the post-cutting rollers 23 as illustrated in FIG. 9(*c*). Thus, the glass roll 1 and the roll core 3 are replaced simultaneously with completion of the winding, and then the processing is sequentially performed. Note that, cutting of the glass film 4 in the width direction may be also performed utilizing the above-mentioned laser splitting.

Note that, the present invention is not limited to the above-mentioned embodiments, and various embodiments can be implemented. For example, an end surface of the glass film 4 may be protected with a resin film or the like. In this case, the glass roll 1 is produced by superposing the resin film on each end surface of the glass film 4 in a region within 1 to 2 cm from the each end surface and winding the resin film and the glass film. Further, in a case of using an adhesive resin film, even when a crack occurs in the end surface of the glass film 4, it is possible to prevent development of the crack. Further, instead of protecting the end surface of the glass film 4 with the resin film, the region within 1 to 2 cm from the end surface may be coated with a protective layer. As the protective layer, there can be used, for example, polyester, polycarbonate, polyvinyl, polyethylene, polyetherimide, polyamide, polyacrylate, polymethacrylate, polysiloxane, polyvinyl alcohol, polyvinyl acetate, a cellulose-based polymer, an epoxy resin, polyurethane, a phenolic resin, a melamine resin, and a urea resin. It is possible to provide those protective layers through application with spray, application with a roller, sticking of the above-mentioned resin film, or the like.

Further, the resin film may be attached at the time of start of winding of the glass film 4 (leading end) and at the time of end of winding (trailing end). In this way, each of the leading end and the trailing end of the glass film is protected with the resin film. Thus, even when supplying the glass roll 1 to various steps under a state in which the leading end or the trailing end of the glass film 4 is directly held, the glass film 4 is less likely to break. The resin film is superposed and attached, for example, onto each of the leading end portion and the trailing end portion of the glass film 4 in the region within approximately 1 to 2 cm from each of the leading end portion and the trailing end portion. A length of the resin film is not particularly limited. For example, the length of the resin film may be set to correspond to a length of a contour of the glass roll 1. Further, it is preferred that the resin film have adhesiveness and an elastic modulus smaller than that of the glass film 4.

Further, as a glass substrate for a display such as a liquid crystal display or an OLED display, there is required clean glass free from adhesion of dust, dirt, and the like for its use. Therefore, it is preferred to maintain a clean state in such a manner that the glass roll 1 is contained in a sealed container and internal gas is replaced with clean gas. Note that, when the glass roll 1 is contained in the sealed container in a clean room, it is unnecessary to replace the internal gas. Further, even when the sealed container is not used, it is possible to maintain a clean state in such a manner that the glass roll 1 is packaged with a shrink film in the clean room.

Figure 10:
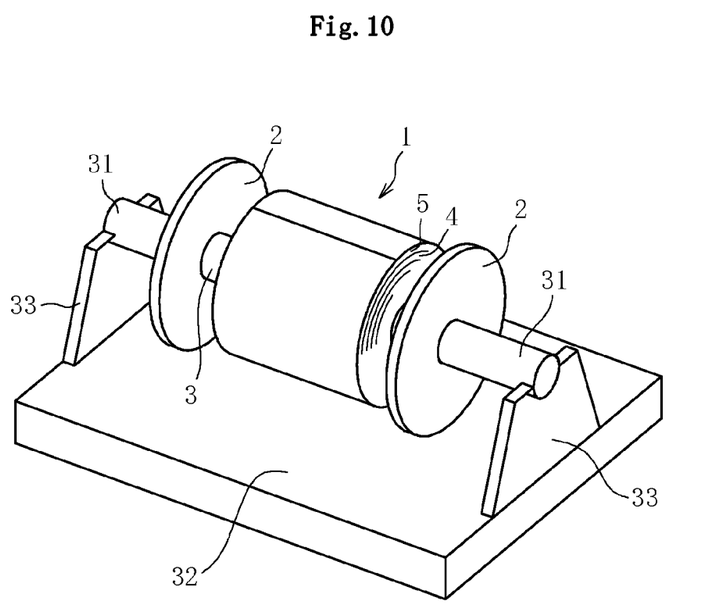
FIG. 10 A view illustrating a modified example of the glass roll according to the present invention.

Further, as illustrated in FIG. 10, a shaft portion 31 protruding from both ends of the flanges 2 may be provided, and the shaft portion 31 may be supported by bearings 33 provided on a pedestal 32. With this configuration, the glass roll 1 is reliably fixed to the pedestal 32. Thus, irrespective of shapes of the flanges 2, it is possible to prevent the glass roll 1 from rolling, and to realize stable transportation. In this case, the flanges 2 and the pedestal 32 may be held in contact with each other, or the flanges 2 may be separated from the pedestal 32. Further, it is preferred that, after the glass roll 1 is arranged on the pedestal 32, the entire glass roll be covered with a packaging box (not shown). This is because a clean state can be maintained by replacing the air inside the packaging box with clean air. In this case, every single glass roll 1 may be packaged in the packaging box, or a plurality of glass rolls 1 may be packaged in one packaging box together. In addition, by adopting a mode of taking the glass roll in and out of the packaging box in such a manner that the pedestal 32 is fixed in the packaging box and the shaft portion 33 of the glass roll 1 is hung by a crane or the like, the pedestal 32 is firmly fixed in the packaging box during transportation, and hence excellent safety is provided.

Figure 11:
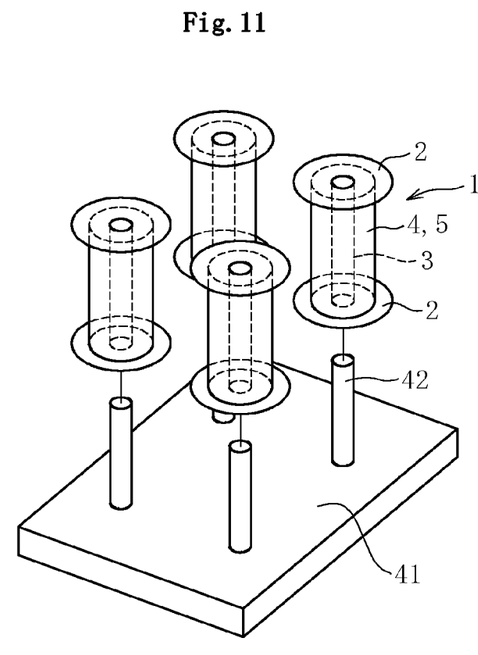
FIG. 11 A view illustrating another modified example of the glass roll according to the present invention.

Further, in the above-mentioned embodiments, description is made of the case where the glass roll 1 is held in the laid posture. However, the glass roll 1 may be held in an upright posture. In this case, as illustrated in FIG. 11, columnar portions 42 are provided upright on an upper surface of a pedestal 41. The glass roll 1 can be placed in the upright posture on the pedestal 41 by inserting each of the columnar portions 42 into the roll core 3 of the glass roll 1. In this way, even if the glass roll 1 is shaken during transportation, the glass roll 1 is fixed by each of the columnar portions 42, and hence it is possible to prevent breakage of the glass film 4, which results from impact of the glass roll 1 on another glass roll. Note that, in view of facilitating loading and unloading of the glass roll 1, it is preferred that the columnar portions 42 be removably attached to the pedestal 41. The columnar portions 42 are provided upright with intervals large enough to prevent the impact of the glass roll 1 on another glass roll when the glass roll 1 is placed. In order to prevent shaking during transportation, a cushioning member may be filled between the glass rolls 1. It is preferred that the pedestal 41 be provided with a hole for a forklift. Further, with provision of a box body (not shown), tight package is possible.

Figure 12A:
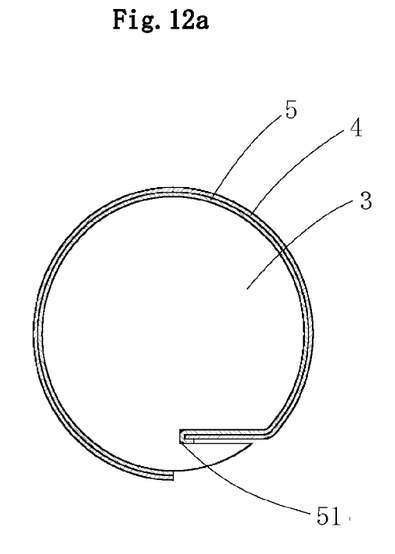
FIG. 12(a) A view illustrating a modified example of a roll core for use in the glass roll according to the present invention.
Figure 12B:
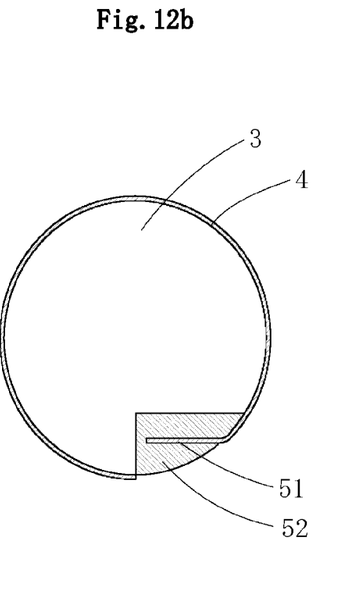
FIG. 12(b) A view illustrating another modified example of the roll core for use in the glass roll according to the present invention.

Further, as illustrated in FIGS. 12(a) and 12(b), a holding groove 51 for holding an end portion of the glass film 4 may be provided in the roll core 3. At the time of start of winding the glass film 4 around the roll core 3, it is difficult to wind the end portion of the glass film 4 along the roll core 3. If winding forcibly, overstress is applied to the end portion to be wound first of the glass film 4 so that the glass film may break. However, when the holding groove 51 is provided, it is possible to eliminate such a situation. Specifically, in a case where winding of the glass film 4 is started after inserting the glass film and the cushion sheet in the holding groove 51 simultaneously while the end portion of the glass film 4 is covered with the folded cushion sheet 5 as illustrated in FIG. 12(a), or in a case where the holding groove 51 is made of a cushioning material 52 as illustrated in FIG. 12(b), winding of the glass film 4 can be smoothly started by starting the winding after inserting only the glass film 4.

Figure 13:
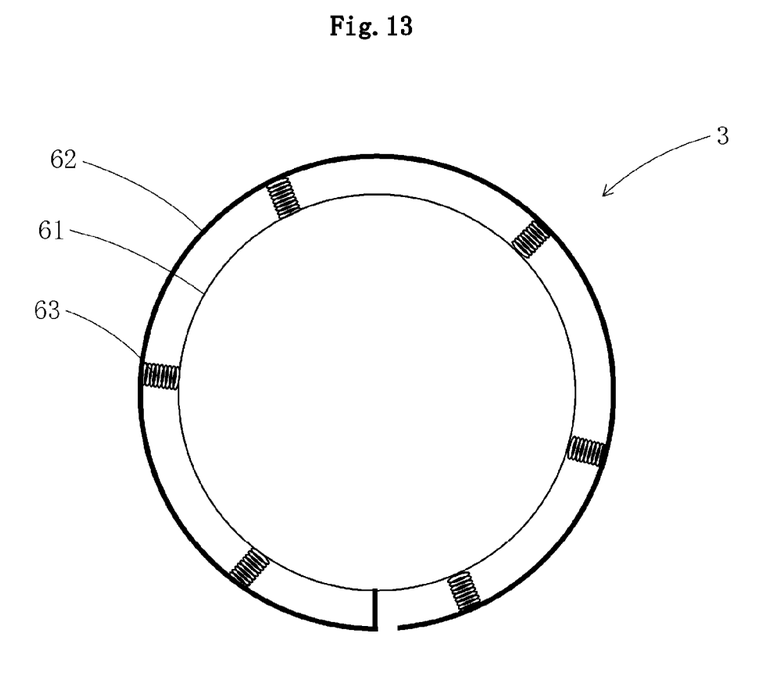
FIG. 13 A view illustrating still another modified example of the roll core for use in the glass roll according to the present invention.

Further, as illustrated in FIG. 13, the roll core 3 may include an inner cylinder 61 and an outer cylinder 62, which form coaxial sleeves having a double-circle shape, and may include elastic members 63 interposed between the inner cylinder 61 and the outer cylinder 62. With this configuration, when pressing the outer cylinder 62 in a center direction, the elastic members 63 contract so that the outer cylinder 62 is reduced in diameter. Consequently, it is possible to easily remove the roll core 3 from the glass roll 1. Note that, instead of interposing the elastic members 63 between the inner cylinder 61 and the outer cylinder 62, when adopting a configuration in which a space within the inner cylinder 61 and the outer cylinder 62 is sealed and the outer cylinder 62 is caused to expand and contract in a radial direction by changing fluid pressure in the internal space, it is possible to obtain the same effect.

Further, FIG. 7 illustrates a mode in which the cushion sheet roll 20 is arranged below the glass film 4, and the cushion sheet 5 is pulled out upward. However, there may be adopted a mode in which the cushion sheet roll 20 is arranged above the glass film 4, and the cushion sheet 5 is pulled out downward. Further, FIG. 7 illustrates a mode of winding the glass film 4 that is being conveyed in a substantially horizontal direction. However, there may be adopted a mode of winding the glass film 4 that is being conveyed in a vertical direction.

Further, FIG. 7 illustrates a mode of winding a long product, in which forming and winding are performed sequentially. In a case of winding a short product, after the glass film 4 is cut into a plurality of pieces by a predetermined length in advance, the plurality of cut glass films 4 may be wound by batch processing. Further, a plurality of short products may be wound into one glass roll 1.

Figure 14:
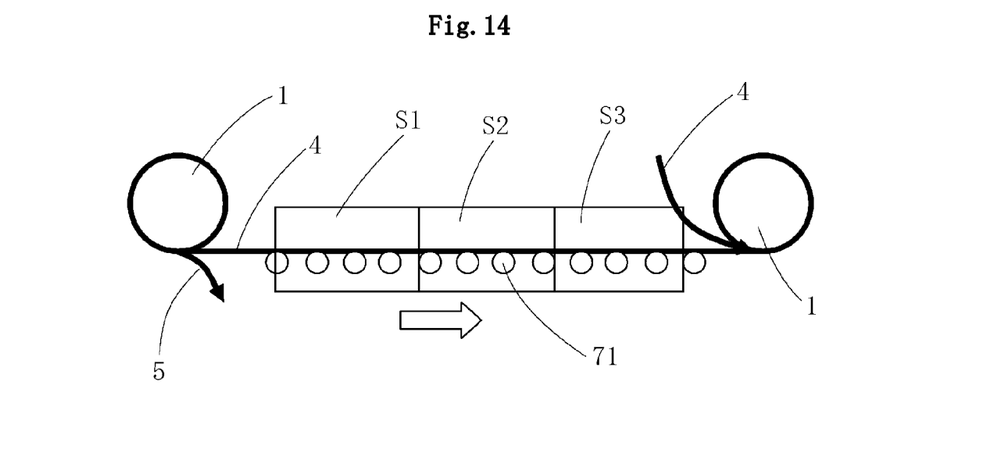
FIG. 14 A side view illustrating a processing method for a glass roll according to the present invention.

Further, when performing processing, such as cleaning and drying, on a glass substrate, only one-by-one conveyance is possible for a conventional rectangular glass substrate. However, in a state of the glass roll 1 formed by winding the glass film 4 into a roll, the glass roll can be subjected to sequential processing using the roll-to-roll method. Specifically, for example, by a method illustrated in FIG. 14, it is possible to perform sequential processing, i.e., a cleaning step S1, a drying step S2, and an antistatic step S3, using the roll-to-roll method. The glass film 4 has flexibility, and hence it is possible to soak the glass roll in a cleaning tank in the cleaning step S1.

Figure 15:
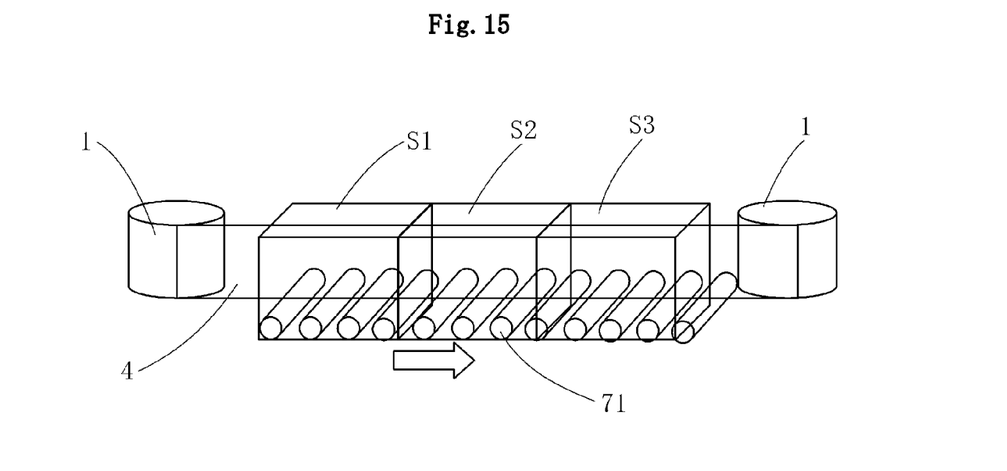
FIG. 15 A side view illustrating another processing method for a glass roll according to the present invention.

When the glass roll 1 is subjected to sequential processing using the roll-to-roll method, as illustrated in FIG. 15, the sequential processing may be performed under a state in which the glass roll 1 is placed upright. The glass film 4 has rigidity higher than that of the resin film, and hence the roll-to-roll method can be implemented under a state in which the film is placed upright. When the roll-to-roll method is implemented under the upright state, satisfactory drainage is achieved after the completion of the cleaning step, and conveying rollers 71 and a surface of the glass film 4 are not held in contact with each other. Thus, it is possible to more reliably prevent occurrence of flaws. Note that, in the processing method illustrated in FIG. 15, when the glass film 4 flutters, an upper portion of the glass film 4 may be supported by a conveying roller (not shown).

Figure 16:
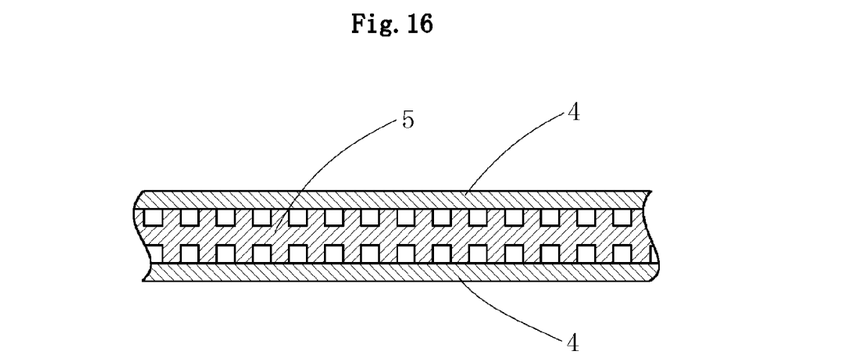
FIG. 16 A view illustrating a modified example of a cushion sheet for use in the glass roll according to the present invention.

At this time, when using the glass roll 1, which is not dried sufficiently after the cleaning, in a step in which moisture is to be excluded strictly, it is necessary to exclude moisture adhering to a surface of glass before using the glass roll, and hence it is necessary to dry the glass roll 1 in a roll state sufficiently before the glass roll 1 is introduced into the step. In this case, as illustrated in FIG. 16, it is preferred to use the cushion sheet 5 having a surface with asperities, which is subjected to embossing or the like. The reason is as follows. A surface of the cushion sheet 5 is not entirely held in contact with the glass film 4, and hence the cushion sheet is excellent in breathability and allows fast drying of the glass film 4. Further, it is preferred that the roll core 3 have a structure excellent in breathability with provision of a hole, a slit, or a mesh. In addition, it is preferred that a heater be arranged on a hollow portion of the roll core 3 and drying be performed by heating from an inside of the roll core 3. After the drying, the glass roll 1 is contained in a sealed container, and a desiccant or the like is put inside the container. In this way, the dried state can be maintained. Further, an end surface of the glass roll 1 can be provided with a sheet-like desiccant (for example, sheet containing silica gel), and be covered with a moisture-proof film (such as metal layer deposited film).

Further, in the above description, description is made of the case where the glass film 4 is formed by the overflow downdraw method. However, the glass film may be formed by a slot downdraw method or a redraw method.

INDUSTRIAL APPLICABILITY

The present invention can be preferably used to a glass substrate used for a flat panel display, such as a liquid crystal display or an OLED display, and for a device such as a solar cell, and used to cover glass for an OLED lighting.

REFERENCE SIGNS LIST 1 glass roll
2 flange
3 roll core
4 glass film
5 cushion sheet
5a extension portion
6 cushion member

The invention claimed is:
1. A glass roll, which is formed by winding a glass film and a cushion sheet, under a state of being superposed, around a roll core including a flange at each end portion of the roll core, wherein an end portion in a width direction of the glass film is separated from the flange on each side in the width direction of the glass film, and cushioning means is arranged between the flange and the end portion in the width direction of the glass film, wherein the cushion sheet is extended beyond the end portion in the width direction of the glass film, and wherein the cushioning means includes an extension portion of the cushion sheet.

2. The glass roll according to claim 1, wherein the extension portion of the cushion sheet is out of contact with the flange.

3. The glass roll according to claim 2, wherein each end portion in the width direction of the glass film includes a cut surface which is cut by laser splitting.

4. The glass roll according to claim 1, wherein the extension portion of the cushion sheet is held in contact with the flange.

5. The glass roll according to claim 4, wherein each end portion in the width direction of the glass film includes a cut surface which is cut by laser splitting.

6. The glass roll according to claim 1, wherein each end portion in the width direction of the glass film includes a cut surface which is cut by laser splitting.

7. A glass roll, which is formed by winding a glass film and a cushion sheet, under a state of being superposed, around a roll core including a flange at each end portion of the roll core, wherein an end portion in a width direction of the glass film is separated from the flange on each side in the width direction of the glass film, and cushioning means is arranged between the flange and the end portion in the width direction of the glass film, wherein the cushioning means includes another cushion member provided separately from the cushion sheet, and wherein the other cushion member is held in contact with only any one of the flange and the end portion in the width direction of the glass film.

8. The glass roll according to claim 7, wherein each end portion in the width direction of the glass film includes a cut surface which is cut by laser splitting.

* * * * *